W. J. KAYSER.
Fly-Traps.
No. 156,574.
Patented Nov. 3, 1874.
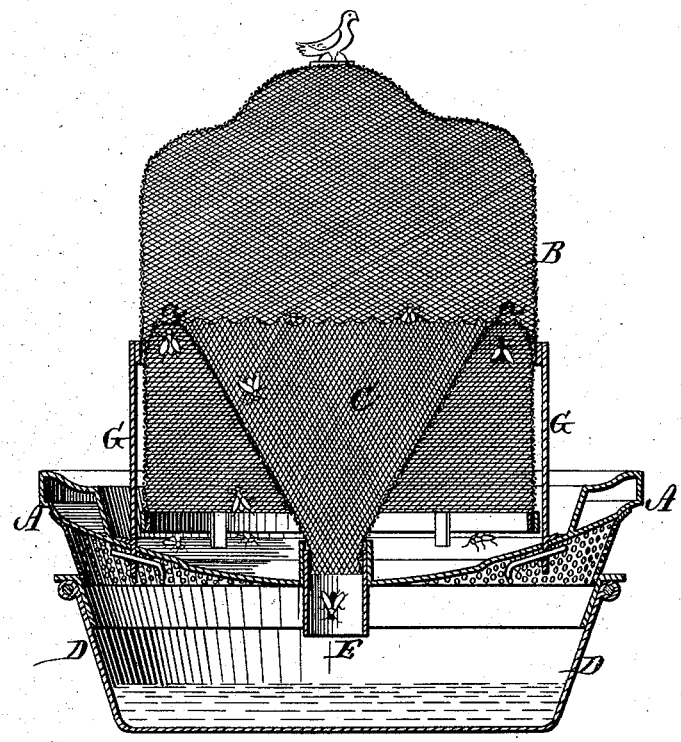

UNITED STATES PATENT OFFICE.

WILLIAM JOHN KAYSER, OF MADISON, WISCONSIN.

IMPROVEMENT IN FLY-TRAPS.

Specification forming part of Letters Patent No. 156,574, dated November 3, 1874; application filed September 23, 1873.

*To all whom it may concern:*

Be it known that I, WILLIAM J. KAYSER, of Madison, in the county of Dane and in the State of Wisconsin, have invented certain new and useful Improvements in Fly-Trap; and do hereby declare that the following is a full, clear, and exact description thereof, reference being had to the accompanying drawings, and to the letters of reference marked thereon, making a part of this specification.

The nature of my invention consists in the construction and arrangement of the several parts of a fly-catcher, the peculiarities of which will be hereinafter particularly described.

In the accompanying drawing, which represents a section of my fly-catcher, A represents a basin with two flanges—one a perforated one, and the other joined to its lower end, which is made close. Through the center of the bottom of this basin a pipe, E, passes down, and opens communication with a water-vessel, D, placed beneath it. In the vessel D water or any poison liquid may be placed, to either drown or poison the flies which pass into it. C represents a gauze-wire basket, which sits in vessel or basin A, but its bottom edge raised enough above it to allow flies to pass under and enter said basket. This basket has a cylindrical shape outwardly, but turns at its top, and passes down again in the shape of a funnel. Its upper edge, at the point where it turns, is perforated with holes large enough for flies to pass through and enter the funnel. After they have entered this funnel they are then hemmed in a chamber formed by a perforated or gauze-wire cap B. When once within the chamber thus formed there is no exit for them except downward, and then they pass through the small end of the funnel, which rests in pipe E, and thence through pipe E into the water or poison vessel D. When a sufficient number have been collected and killed in vessel D, said vessel is removed, and the dead flies are thrown away.

It will be seen that the funnel portion of the basket turns down within the outer or cylindrical portion, and is consequently much smaller, thus leaving a sufficient fly-space between the walls of the funnel and those of the basket for the flies to pass up freely.

Having thus fully described my invention, what I claim as new, and desire to secure by Letters Patent, is—

1. The basket C, with its funnel-shaped center, in combination with the cap B, made of gauze wire, and the basin and water-vessel, constructed and arranged as and for the purpose set forth.

2. The basin with its perforated flange, in combination with the basket and gauze cap, as and for the purpose set forth.

In testimony that I claim the foregoing I have hereunto set my hand this 2d day of September, 1874.

WILLIAM JOHN KAYSER.

Witnesses:
JUSTIN P. SWITZER,
ADOLPH KAYSER.